United States Patent
Abe et al.

(10) Patent No.: US 12,466,372 B2
(45) Date of Patent: Nov. 11, 2025

(54) SADDLED VEHICLE

(71) Applicant: HONDA MOTOR CO., LTD., Tokyo (JP)

(72) Inventors: Yotaro Abe, Tokyo (JP); Shunichi Miyagishi, Tokyo (JP); Chikashi Iizuka, Tokyo (JP); Makoto Toda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 18/413,061

(22) Filed: Jan. 16, 2024

(65) Prior Publication Data
US 2024/0253606 A1    Aug. 1, 2024

(30) Foreign Application Priority Data
Jan. 30, 2023    (JP) ................................. 2023-011672

(51) Int. Cl.
    *B60T 8/171*      (2006.01)
    *B60T 8/17*       (2006.01)
    (Continued)

(52) U.S. Cl.
    CPC ............ *B60T 8/261* (2013.01); *B60T 8/1706* (2013.01); *B60T 8/171* (2013.01);
    (Continued)

(58) Field of Classification Search
    CPC ...... B60T 8/1706; B60T 8/171; B60T 8/1755; B60T 8/17555; B60T 8/26; B60T 8/261; B60T 8/3225; B62L 3/02; B62L 3/08
    See application file for complete search history.

(56) References Cited

U.S. PATENT DOCUMENTS

| | | | |
|---|---|---|---|
| 4,440,452 A * | 4/1984 | Burckhardt | ............ B60T 11/16 |
| | | | 188/106 R |
| 6,309,029 B1 * | 10/2001 | Wakabayashi | ............ B62L 1/00 |
| | | | 188/106 P |

(Continued)

FOREIGN PATENT DOCUMENTS

| | | |
|---|---|---|
| EP | 1964738 A2 | 9/2008 |
| JP | 2000264278 A | 9/2000 |

(Continued)

OTHER PUBLICATIONS

Notification of Reasons for Refusal issued Sep. 3, 2024 in the JP Patent Application No. 2023-011672.

*Primary Examiner* — Erick R Solis
(74) *Attorney, Agent, or Firm* — CKC & Partners Co., LLC

(57) ABSTRACT

Provided is a saddled vehicle capable of optimizing distribution of a braking force between front and rear wheels at the time of deceleration during linear traveling, before entering a corner, and in a similar situation. A saddled vehicle (1) includes: a front wheel braking component (32) that applies a braking force to a front wheel (WF); and a rear wheel braking component (34) that applies a braking force to a rear wheel (WR), and is configured to operate the front wheel braking component (32) and the rear wheel braking component (34) in an interlocking manner in response to an operation of an operating element (5) as a single operating element. In response to the operation of the operating element (5), the front wheel braking component (32) first starts operating, and thereafter, in response to a braking condition of the front wheel braking component (32) satisfying a first condition, the rear wheel braking component (34) starts operating. In response to satisfaction of the first condition, the braking force of the rear wheel braking component (34) is increased while the braking force of the (Continued)

front wheel braking component (32) is maintained at a first front-wheel-braking force (P1).

10 Claims, 9 Drawing Sheets

(51) Int. Cl.
    *B60T 8/1755* (2006.01)
    *B60T 8/26* (2006.01)
    *B60T 17/22* (2006.01)
    *B62L 3/00* (2006.01)
    *B62L 3/02* (2006.01)
    *B62L 3/08* (2006.01)

(52) U.S. Cl.
    CPC .......... *B60T 8/17555* (2013.01); *B60T 17/22* (2013.01); *B62L 3/00* (2013.01); *B62L 3/02* (2013.01)

(56) References Cited

U.S. PATENT DOCUMENTS

| | | | |
|---|---|---|---|
| 6,409,285 B1* | 6/2002 | Wakabayashi | B62L 3/08 |
| | | | 303/9.64 |
| 10,814,850 B2* | 10/2020 | Chang | B62L 3/08 |
| 2012/0175197 A1* | 7/2012 | Tseng | B62L 3/08 |
| | | | 188/24.11 |
| 2012/0234633 A1* | 9/2012 | Lu | B62L 3/08 |
| | | | 188/24.22 |
| 2013/0238206 A1* | 9/2013 | Lemejda | B60T 8/1766 |
| | | | 701/70 |
| 2014/0015221 A1* | 1/2014 | Inoue | B62L 3/08 |
| | | | 280/281.1 |
| 2019/0263471 A1* | 8/2019 | Chang | B60T 8/261 |
| 2021/0046911 A1* | 2/2021 | Levi | B60L 3/0015 |
| 2021/0309195 A1 | 10/2021 | Oshida | |
| 2023/0060955 A1* | 3/2023 | Igari | B60T 8/17558 |
| 2023/0063777 A1 | 3/2023 | Yamamoto | |

FOREIGN PATENT DOCUMENTS

| | | |
|---|---|---|
| JP | 2008207682 A | 9/2008 |
| JP | 2021112950 A | 8/2021 |
| WO | 2020021382 A1 | 1/2020 |

* cited by examiner

SADDLED VEHICLE

This application is based on and claims the benefit of priority from Japanese Patent Application No. 2023-011672, filed on 30 Jan. 2023, the content of which is incorporated herein by reference.

BACKGROUND OF THE INVENTION

Field of the Invention

The present invention relates to a saddled vehicle, and more particularly, to a saddled vehicle to which a front-rear interlock brake that operates a front wheel brake and a rear wheel brake in an interlocking manner in response to an operation of a single operating element is applied.

Related Art

Conventionally, there has been a known vehicle equipped with a brake system that can cause a vehicle body to favorably behave during braking by adjusting distribution of a braking force between the front and rear wheels.

Patent Document 1 discloses a technique that allows a brake system of a four-wheeled vehicle to adjust distribution of a braking force between the front and rear wheels in order to suppress a pitch behavior of the vehicle body when the four-wheeled vehicle stops in response to a braking operation.

Patent Document 1: Japanese Unexamined Patent Application, Publication No. 2021-112950

SUMMARY OF THE INVENTION

However, the technique disclosed in Patent Document 1 is intended to suppress the pitch behavior of a four-wheeled vehicle at the time of stopping, and has been developed without consideration of braking force distribution between front and rear wheels that is suitable for when a saddled vehicle such as a two-wheeled vehicle, which tends to experience a considerable change in the posture of the vehicle body during braking, decelerates during linear traveling, before entering a corner, and in a similar situation.

It is an object of the present invention to provide a saddled vehicle that can overcome the above-mentioned disadvantage of the known art and can optimize distribution of a braking force between front and rear wheels at the time of deceleration during linear traveling, before entering a corner, and in a similar situation.

To achieve the above object, the present invention provides a saddled vehicle (1) including: a front wheel braking component (32) that applies a braking force to a front wheel (WF); and a rear wheel braking component (34) that applies a braking force to a rear wheel (WR), and is configured to operate the front wheel braking component (32) and the rear wheel braking component (34) in an interlocking manner in response to an operation of an operating element (5) as a single operating element. The present invention has a first feature in which in response to the operation of the operating element (5), the front wheel braking component (32) first starts operating, and thereafter, in response to a braking condition of the front wheel braking component (32) satisfying a first condition, the rear wheel braking component (34) starts operating.

The present invention has a second feature in which in response to satisfaction of the first condition, the braking force of the rear wheel braking component (34) is increased while the braking force of the front wheel braking component (32) is maintained at a first front-wheel-braking force (P1).

The present invention has a third feature in which once the braking force of the rear wheel braking component (34), which is increased, reaches a first rear-wheel-braking force (P2), the braking force of the rear wheel braking component (34) is maintained at the first rear-wheel-braking force (P2).

The present invention has a fourth feature in which the first rear-wheel-braking force (P2) varies in accordance with an operation amount of the operating element (5).

The present invention has a fifth feature in which in response to a lapse of a predetermined time period (T1) from the satisfaction of the first condition, the braking force of the front wheel braking component (32) starts transitioning to a second front-wheel-braking force (P4), and the braking force of the rear wheel braking component (34) starts transitioning to a second rear-wheel-braking force (P3) that is less than the second front-wheel-braking force (P4).

The present invention has a sixth feature in which the second front-wheel-braking force (P4) and the second rear-wheel-braking force (P3) vary in accordance with an operation amount of the operating element (5).

The present invention has a seventh feature in which an actuating force generator (40) configured to actuate the front wheel braking component (32) in response to an operation of the operating element (5) is further provided, and the first condition is that an actuating force generated by the actuating force generator (40) becomes equal to or greater than a predetermined value.

The present invention has an eighth feature in which the actuating force generator (40) includes a front wheel master cylinder that generates a hydraulic pressure in response to an operation of the operating element (5), and the actuating force is a hydraulic pressure that is detectable by a hydraulic pressure sensor (50).

The present invention has a ninth feature in which when a roll angular velocity of a vehicle body of the saddled vehicle (1) is maximized after the satisfaction of the first condition, the braking force of the front wheel braking component (32) starts transitioning to a second front-wheel-braking force (P4), and the braking force of the rear wheel braking component (34) starts transitioning to a second rear-wheel-braking force (P3) that is less than the second front wheel-braking-force (P4).

According to the first feature, in the saddled vehicle (1), which includes the front wheel braking component (32) for applying a braking force to the front wheel (WF) and the rear wheel braking component (34) for applying a braking force to the rear wheel (WR), and which is configured to operate the front wheel braking component (32) and the rear wheel braking component (34) in an interlocking manner in response to an operation of the operating element (5) as a single operating element, the front wheel braking component (32) first starts operating in response to the operation of the operating element (5), and thereafter, the rear wheel braking component (34) starts operating in response to a braking condition of the front wheel braking component (32) satisfying a first condition. Thus, in the saddled vehicle equipped with the front-rear interlocking brake system, a braking force is first applied to the front wheel, and thereafter, a braking force is applied to the rear wheel, thereby suppressing nosedive of the vehicle body at the time of deceleration during linear traveling. In addition, the operation of the one operating element allows the vehicle body to behave to facilitate banking of the vehicle body at the time of deceleration before entering a corner, while making the interlocking brake work. Furthermore, since the braking force is applied to only the front wheel until the first condition is satisfied, it is possible to fill the need for the driver of a saddled vehicle equipped with the front-rear interlocking brake system to apply a braking force to only the front wheel.

According to the second feature, in response to satisfaction of the first condition, the braking force of the rear wheel braking component (34) is increased while the braking force of the front wheel braking component (32) is maintained at the first front-wheel-braking force (P1). Thus, the braking force for the rear wheel is increased while a constant braking force is being applied to the front wheel, thereby making it possible to apply the braking forces to the front and rear wheels more stably while gradually transferring the load on the front wheel to the rear wheel.

According to the third feature, once the braking force of the rear wheel braking component (34), which is increased, reaches the first rear-wheel-braking force (P2), the braking force of the rear wheel braking component (34) is maintained at the first rear-wheel-braking force (P2). Thus, maintaining the braking force of the rear wheel braking component at the first rear-wheel-braking force makes it possible to suppress the nosedive of the vehicle body.

The fourth feature, in which the first rear-wheel-braking force (P2) varies in accordance with an operation amount of the operating element (5), makes it possible to obtain the first rear-wheel-braking force that conforms to the driver's intention to brake to the saddled vehicle.

According to the fifth feature, in response to the lapse of the predetermined time period (T1) from the satisfaction of the first condition, the braking force of the front wheel braking component (32) starts transitioning to the second front-wheel-braking force (P4), and the braking force of the rear wheel braking component (34) starts transitioning to the second rear-wheel-braking force (P3), which is less than the second front-wheel-braking force (P4). That is, in response to the lapse of the predetermined time period from the satisfaction of the first condition, the transition is started so that the braking force for the front wheel becomes greater than the braking force for the rear wheel, making it possible to naturally guide the driver's riding posture to a forward leaning posture while suppressing the nosedive of the vehicle body.

The sixth feature, in which the second front-wheel-braking force (P4) and the second rear-wheel-braking force (P3) vary in accordance with an operation amount of the operating element (5), makes it possible to obtain the second front-wheel-braking force and the second rear-wheel-braking force that conform to the driver's intention to brake to the saddled vehicle.

According to the seventh feature, the actuating force generator (40) configured to actuate the front wheel braking component (32) in response to an operation of the operating element (5) is further provided, and the first condition is that the actuating force generated by the actuating force generator (40) becomes equal to or greater than a predetermined value. Thus, the first condition is based on the predetermined value for the actuating force that varies directly in accordance with the operation of the operating element, thereby making it possible to more promptly sense the driver's intention to brake to the saddled vehicle.

According to the eighth feature, the actuating force generator (40) includes a front wheel master cylinder that generates a hydraulic pressure in response to an operation of the operating element (5), and the actuating force is the hydraulic pressure that is detectable by the hydraulic pressure sensor (50). Therefore, setting the hydraulic pressure generated by the front wheel master cylinder as a condition for actuating the rear wheel braking component makes it possible to more promptly sense the driver's intention to brake to the saddled vehicle.

According to the ninth feature, when a roll angular velocity of a vehicle body of the saddled vehicle (1) is maximized after the satisfaction of the first condition, the braking force of the front wheel braking component (32) starts transitioning to the second front-wheel-braking force (P4), and the braking force of the rear wheel braking component (34) starts transitioning to the second rear-wheel-braking force (P3) that is less than the second front wheel-braking-force (P4). Therefore, a force that keeps the vehicle body upright is enhanced when the roll angular velocity of the vehicle body is maximized during cornering, thereby allowing the saddled vehicle to take a next action more smoothly.

DETAILED DESCRIPTION OF THE INVENTION

Figure 1:
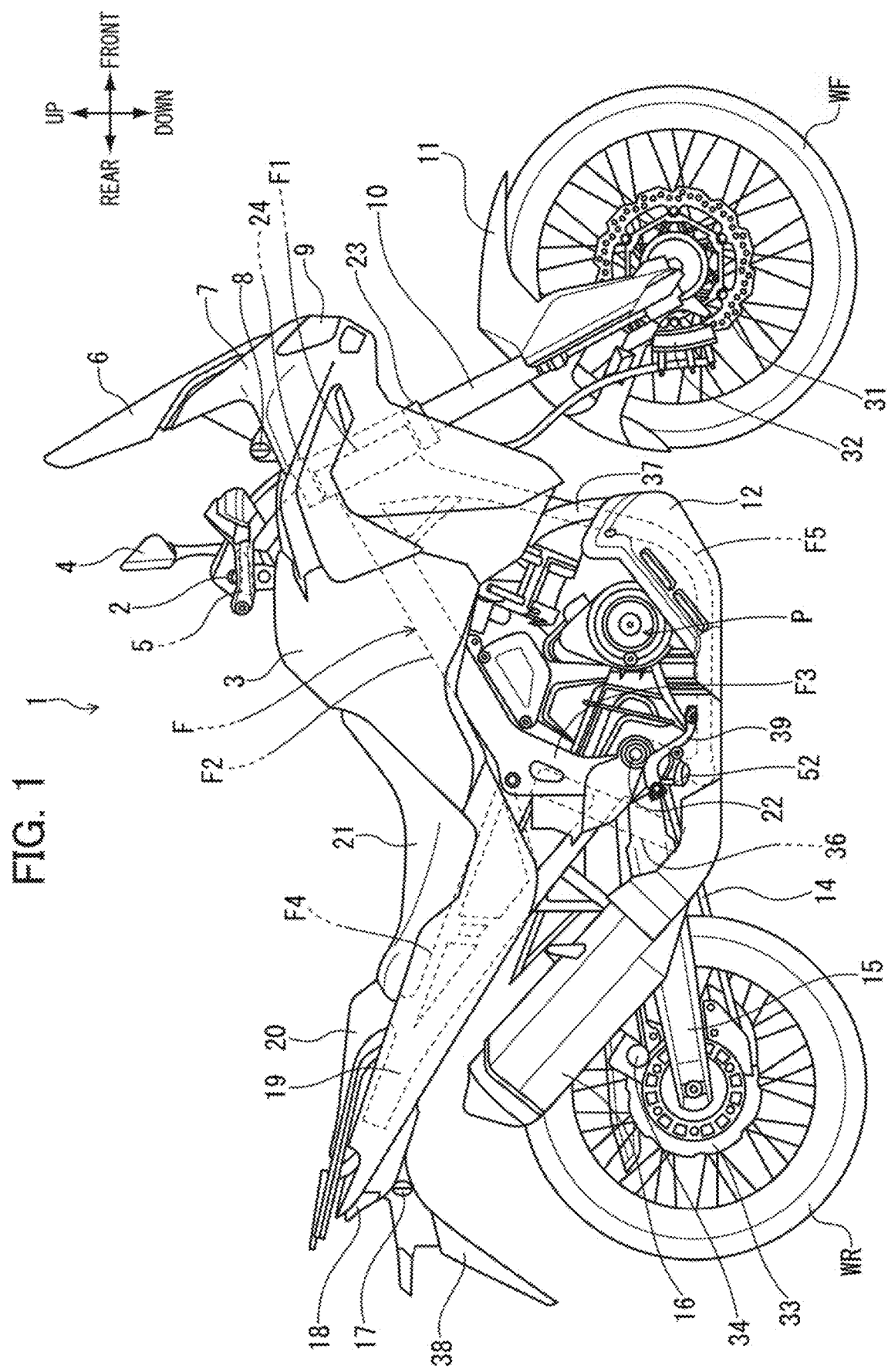
FIG. 1 is a right side view of a motorcycle according to an embodiment of the present invention.

Preferred embodiments of the present invention will be described below in detail with reference to the accompanying drawings. FIG. 1 is a right side view of a motorcycle 1 according to an embodiment of the present invention. The motorcycle 1 is a saddled vehicle in which a driving force generated by a power unit P is transmitted to a rear wheel WR via a drive chain 14. A steering stem (not shown) is pivotally supported in a swingable manner on a head pipe F1 located at a front end of a vehicle body frame F. A bottom bridge 23 and a top bridge 24 that support a pair of left and right front forks 10 are fixed below and above the steering stem.

A steering handlebar 2 having a rearview mirror 4 supported thereon is mounted to an upper portion of the top bridge 24, and a brake lever 5 functioning as an operating element operable by a driver's right hand is attached to a right portion of the steering handlebar 2 in the vehicle width direction. A front wheel brake caliper 32 is mounted to the front forks 10, and functions as a front wheel braking component for applying a braking force to a front wheel brake disc 31 that rotates in synchronization with a front wheel WF. A front fender 11 covering a portion above the front wheel WF is fixed to the front forks 10.

A pair of left and right main frames F2 extending obliquely rearward and downward and an underframe F5 extending downward and supporting the lower side of the power unit P are mounted to a rear portion of the head pipe F1. A pivot frame F3 having a pivot 22 that pivotally supports a swing arm 15 in a swingable manner is coupled to rear ends of the main frames F2, and a rear end of the underframe F5 is coupled to a lower end of the pivot frame F3. A pair of left and right foot pegs 52 for the driver to rest his/her feet thereon are mounted to the pivot frame F3.

The driving force of the power unit P, which is surrounded and supported by the main frames F2 and the underframe F5, is transmitted to the rear wheel WR via the drive chain 14. An underguard 12 is attached to the bottom of a front portion of the power unit P. Combustion gas from the power unit P is sent to a muffler 16 at the rear of the vehicle body through an exhaust pipe 37 passing through the interior of the underguard 12.

The rear wheel WR is rotatably supported on a rear end portion of the swing arm 15, which is pivotally supported on the pivot 22 and suspended from the vehicle body via a rear cushion 36. The swing arm 15 supports a rear wheel brake caliper 34 functioning as a rear wheel braking component that applies a braking force to a rear wheel brake disc 33 that rotates in synchronization with the rear wheel WR. The pivot frame F3 on the right side in the vehicle width direction pivotally supports a brake pedal 39 in a swingable manner, which is operable by the driver's right foot rested on the foot peg 52.

A front cowl 7 that supports a headlight 9, a windshield screen 6, and a pair of left and right front flasher lamps 8 is disposed in a portion of the vehicle body located forward of the head pipe F1. A fuel tank 3 is disposed in a portion of the vehicle body located rearward of the front cowl 7 and above the main frames F2. A rear frame F4 that supports a front seat 21 on which a driver is seated and a rear seat 20 on which a passenger is seated is fixed to a rear portion of the pivot frame F3. The left and right sides of the rear frame F4 in the vehicle width direction are covered with a rear cowl 19, and a rear fender 38 having a tail lamp device 18 and a pair of left and right rear flasher lamps 17 supported thereon is mounted to a rear end portion of the rear cowl 19.

Figure 2:
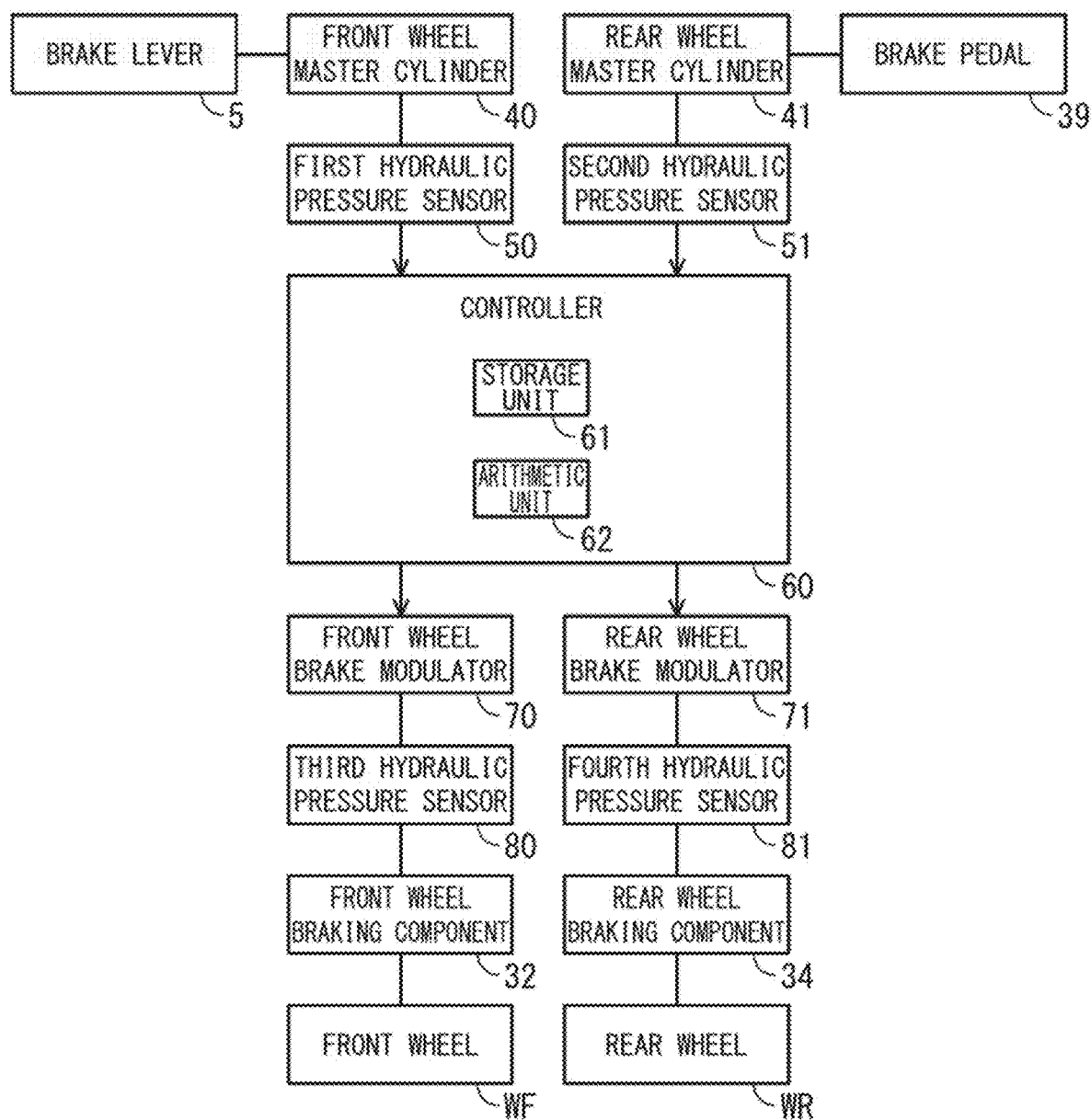
FIG. 2 is a block diagram illustrating a configuration of a front-rear interlocking brake system installed in the motorcycle.

FIG. 2 is a block diagram illustrating a configuration of a front-rear interlocking brake system installed in the motorcycle 1. The motorcycle 1 according to the present embodiment includes the front-rear interlocking brake system that operates the front wheel braking component 32 and the rear wheel braking component 34 in an interlocking manner in response to an operation of the brake lever 5 as a single operating element.

The brake lever 5 is coupled to a front wheel master cylinder 40 functioning as an actuating force generator for generating a hydraulic pressure that generates a braking force. A first hydraulic pressure sensor 50 detects the actuating force (hydraulic pressure) generated by the front wheel master cylinder 40. On the other hand, the brake pedal 39 is coupled to a rear wheel master cylinder 41. A second hydraulic pressure sensor 51 detects an actuating force (hydraulic pressure) generated by the rear wheel master cylinder 41. The present invention is characterized by a way in which a braking force is distributed between the front and rear wheels when the front-rear interlocking brake operates in response to an operation of the brake lever 5.

A controller 60 controls a front wheel brake modulator 70 and a rear wheel brake modulator 71 that each generate a hydraulic pressure by means of an actuator based on, for example, an output signal from the first hydraulic pressure sensor 50 or an output signal from the second hydraulic pressure sensor 51. The hydraulic pressure generated by the front wheel brake modulator 70 is fed to the front wheel braking component 32 that brakes to the front wheel WF. The hydraulic pressure generated by the rear wheel brake modulator 71 is fed to the rear wheel braking component 34 that brakes to the rear wheel WR. The hydraulic pressures to be fed to the front wheel braking component 32 and the rear wheel braking component 34 are detected by a third hydraulic pressure sensor 80 and a fourth hydraulic pressure sensor 81.

The controller 60 includes a storage unit 61 and an arithmetic unit 62 for controlling the front wheel brake modulator 70 and the rear wheel brake modulator 71. The controller 60 operates the front wheel braking component 32 and the rear wheel braking component 34 in an interlocking manner while adjusting the braking force distribution between the front and rear wheels in accordance with a way in which the brake lever 5 is operated, a state in which the motorcycle 1 is being driven, and the like. The braking force distribution between the front and rear wheels is calculated by the arithmetic unit 62 constituted by a microcomputer, and calculation expressions for calculating the braking force distribution are stored in the storage unit 61.

Figure 3:
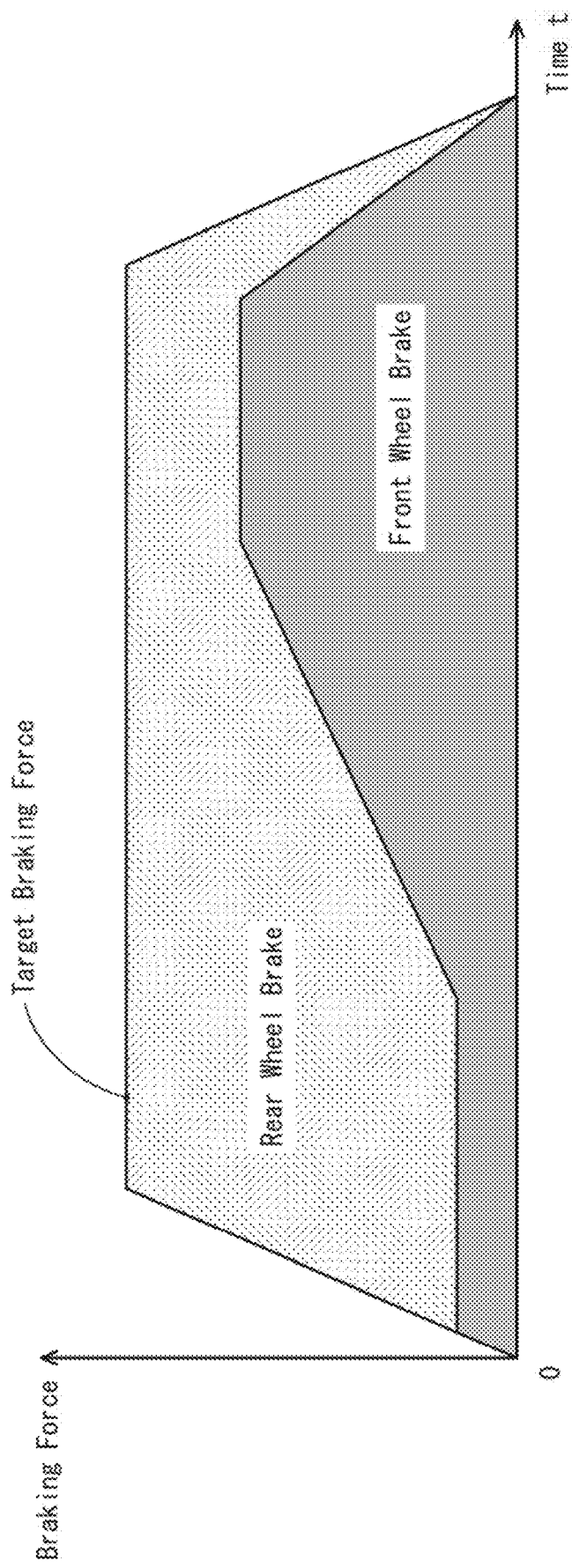
FIG. 3 is a conceptual diagram illustrating braking force distribution between front and rear wheels during braking that takes place in response to an operation of a brake lever.

FIG. 3 is a conceptual diagram illustrating a braking force distribution between the front and rear wheels during braking that takes place in response to an operation of the brake lever 5. In FIG. 3, a target braking force for the entire vehicle when the brake lever 5 is operated is represented as the trapezoid, which is divided into a distribution to the front wheel brake and a distribution to the rear wheel brake, thereby showing the overview of the braking force distribution.

The braking operation according to the present embodiment is designed such that in response to the operation of the brake lever 5, the front wheel brake first starts operating, and thereafter, the rear wheel brake starts operating. At an early stage of the braking operation, the distribution to the rear wheel brake is greater than the distribution to the front wheel brake, at a middle stage of the braking operation, the relationship between the distribution to the front and the distribution to the rear wheel is reversed, and at a late stage of the braking operation, the distribution to the front wheel brake becomes greater than the distribution to the rear wheel. This feature makes it possible not only to suppress nosedive of the vehicle body at the time of deceleration during linear traveling but also to facilitate banking of the vehicle body at the time of deceleration before entering a corner.

Figure 4:
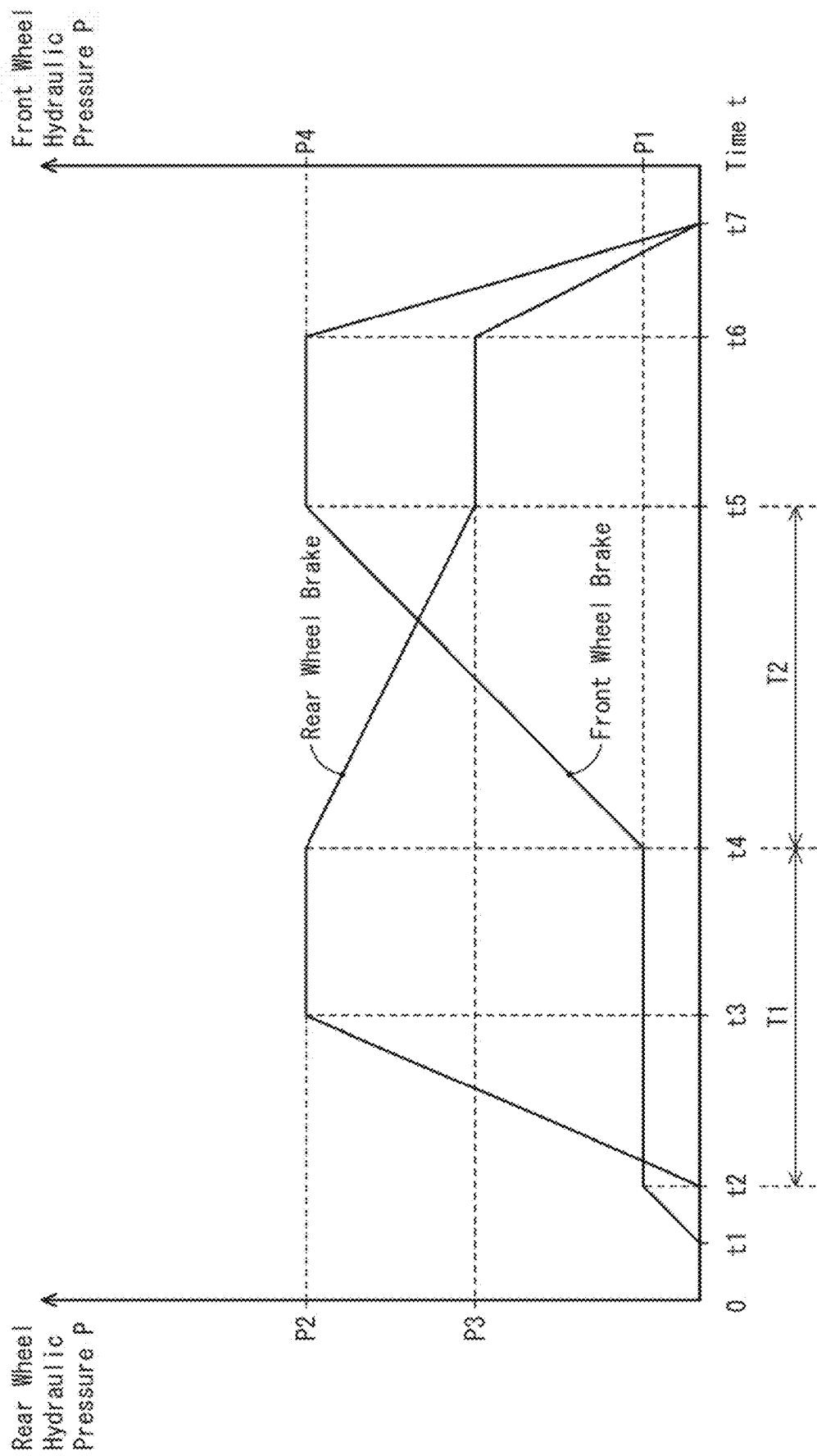
FIG. 4 is a graph illustrating changes in an output signal from a third hydraulic pressure sensor and changes in an output signal from a fourth hydraulic pressure sensor that are caused by an operation of a brake lever.

FIG. 4 is a graph illustrating changes in the output signal from the third hydraulic pressure sensor 80 and changes in the output signal from the fourth hydraulic pressure sensor 81 that are caused by an operation of the brake lever 5. The braking force of the front wheel braking component 32 and the braking force of the rear wheel braking component 34 are generated by the front wheel brake modulator 70 and the rear wheel brake modulator 71. The output signal from the third hydraulic pressure sensor 80 and the output signal from the fourth hydraulic pressure sensor 81 correspond to the braking force applied by the front wheel braking component 32 and the braking force applied by the rear wheel braking component 34, respectively.

At time t1, an operation of the brake lever 5 is started, and in response, the output from the first hydraulic pressure sensor 50 rises. At time t2, the output from the first hydraulic pressure sensor 50 reaches a hydraulic pressure P1 corresponding to a first front-wheel-braking force, and a first condition as a braking condition is satisfied. The present embodiment is configured such that the front wheel braking component 32 first starts operating in response to the operation of the brake lever 5, and thereafter, the rear wheel braking component 34 starts operating in response to the braking condition of the front wheel braking component 32 satisfying the first condition. Specifically, in response to satisfaction of the first condition at time t2, the rear wheel brake modulator 71 starts operating, and the output from the fourth hydraulic pressure sensor 81 that detects the hydraulic pressure fed to the rear wheel braking component 34 rises.

In the present embodiment, when the braking condition of the front wheel braking component 32 satisfies the first condition, the braking force of the rear wheel braking component 34 is increased while the braking force of the front wheel braking component 32 is maintained at the first front-wheel-braking force. Specifically, in response to satisfaction of the first condition at time t2, the hydraulic pressure of the front wheel braking component 32 detected by the third hydraulic pressure sensor 80 is maintained at the hydraulic pressure P1 corresponding to the first front-wheel-braking force, and the hydraulic pressure of the rear wheel braking component 34 starts increasing.

Next, at time t3, the hydraulic pressure of the rear wheel braking component 34, which has started increasing since time t2, reaches a hydraulic pressure P2 corresponding to a first rear-wheel-braking force. In the present embodiment, once the hydraulic pressure of the rear wheel braking component 34 reaches the hydraulic pressure P2 corresponding to the first rear-wheel-braking force, the braking force of the rear wheel braking component 34 is maintained at the first rear-wheel-braking force. Specifically, in response to the hydraulic pressure of the rear wheel braking component 34 reaching the hydraulic pressure P2 corresponding to the first rear-wheel-braking force at time t3, the hydraulic pressure of the front wheel braking component 32 and the hydraulic pressure of the rear wheel braking component 34 are each controlled to be maintained constant.

At time t4, a lapse of a predetermined time period T1 from time t2 at which the first condition was satisfied triggers transition of the braking force of the front wheel braking component 32 and the braking force of the rear wheel braking component 34. Specifically, the hydraulic pressure of the front wheel braking component 32 starts increasing toward a hydraulic pressure P4 corresponding to a second front-wheel-braking force, and the hydraulic pressure of the rear wheel braking component 34 starts decreasing toward a hydraulic pressure P3 corresponding to a second rear-wheel-braking force. In the present embodiment, the hydraulic pressure P3 is set to be lower than the hydraulic pressure P4, and the relationship between the braking force of the front wheel braking component 32 and the braking force of the rear wheel braking component 34 in terms of braking force level is reversed after the start of the transition at time t4.

Next, at time t5 at which a second predetermined time period T2 from time t4 elapses, the hydraulic pressure of the front wheel braking component 32 reaches the hydraulic pressure P4 corresponding to the second front-wheel-braking force, and the hydraulic pressure of the rear wheel braking component 34 reaches the hydraulic pressure P3 corresponding to the second rear-wheel-braking force. The present embodiment is configured such that the hydraulic pressure of the front wheel braking component 32 is maintained constant at the hydraulic pressure P4, and the hydraulic pressure of the rear wheel braking component 34 is maintained constant at the hydraulic pressure P3 from time t5 at which the second predetermined time period T2 as the transition period ends.

At time t6, the brake lever 5 starts to be released from the operation. In response, the hydraulic pressure of the front wheel braking component 32 and the hydraulic pressure of the rear wheel braking component 34 start decreasing to become zero at time t7.

Figure 5:
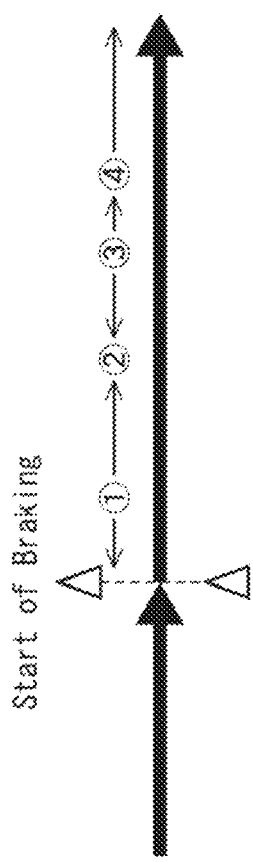
FIG. 5 is a conceptual diagram illustrating a configuration of a braking operation at the time of linear traveling.
Figure 6:
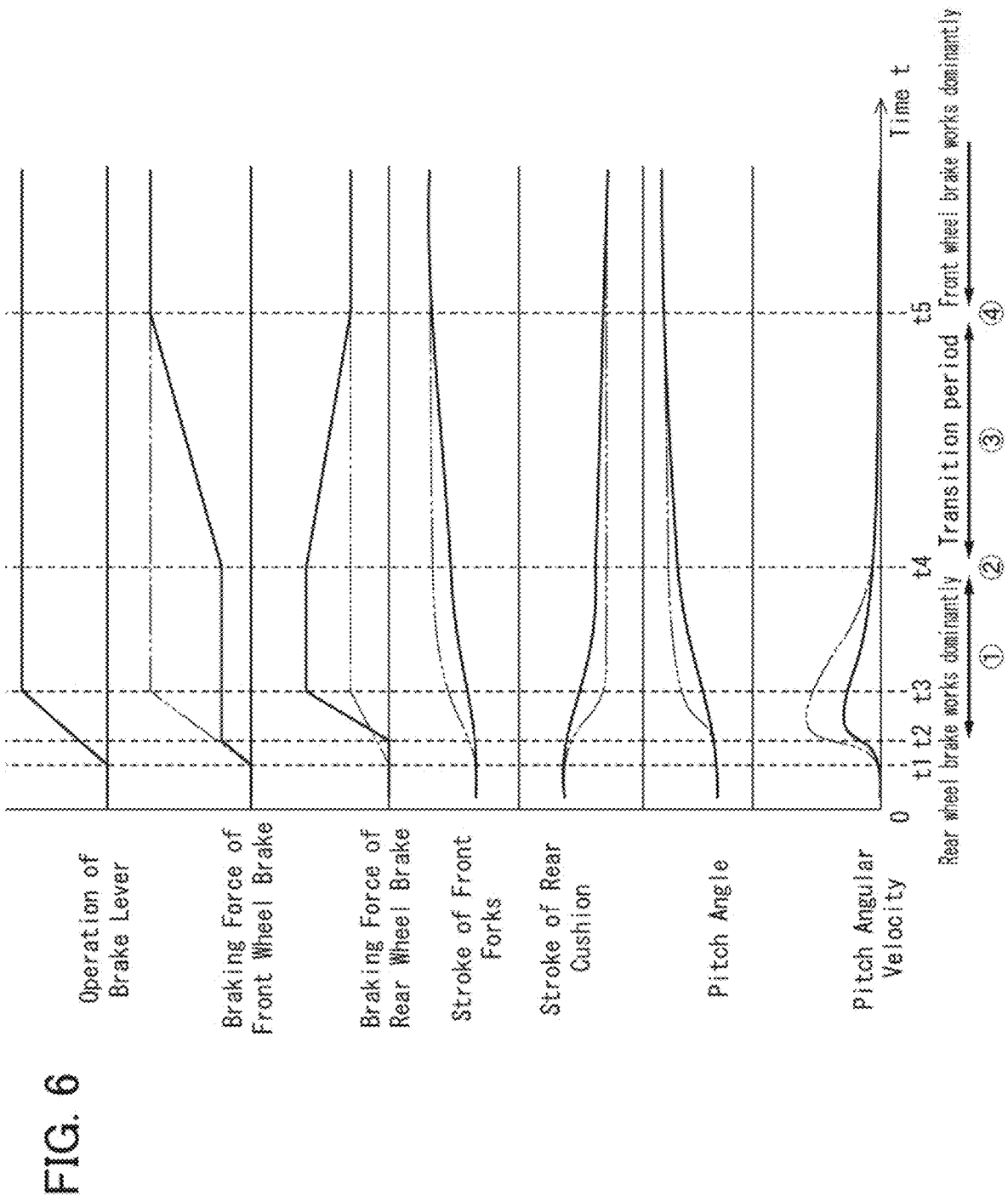
FIG. 6 is a graph illustrating changes in parameters corresponding to the braking operation of FIG. 5.

FIG. 5 is a conceptual diagram illustrating a configuration of a braking operation at the time of linear traveling. FIG. 6 is a graph illustrating changes in parameters corresponding to the braking operation of FIG. 5. In both FIGS. 5 and 6, "1" in a circle (hereinafter described as (1)) represents an early braking stage at which the rear wheel brake dominantly works, "2" in a circle (hereinafter described as (2)) represents the timing at which transition starts, "3" in a circle (hereinafter described as (3)) represents a middle braking stage as a transition period, and "4" in a circle (hereinafter described as (4)) represents a late braking stage at which the front wheel brake dominantly works.

The graph of FIG. 6 shows, in the order from top to bottom, an operation of the brake lever, a braking force of the front wheel brake, a braking force of the rear wheel brake, a stroke of the front forks, a stroke of the rear cushion, a pitch angle of the vehicle body, and a pitch angular velocity of the vehicle body. In the graph, the changes in the case of the control according to the present invention are indicated by the solid lines, and the changes in the case of the conventional control are indicated by the two-dot chain lines. Times t1 to t5 in FIG. 6 correspond to those of the graph of FIG. 4.

The braking operation according to the present invention is roughly divided into three stages, i.e., the early braking stage (1) at which the rear wheel brake dominantly works, the middle braking stage (3) at which the relationship between the braking forces of the front wheel brake and the rear wheel brake in terms of braking force level is reversed, and the late braking stage (4) at which the front wheel brake dominantly works. According to the present invention, the distribution of the braking force to the rear wheel brake is increased at the early braking stage, and the front wheel braking force is gradually increased at the middle braking stage. This feature makes it is possible to reduce a rate of change in the stroke of the front forks and a rate of change in the stroke of the rear cushion, and as a result, the pitch behavior (nosedive) of the vehicle body can be suppressed.

More specifically, at the time of braking to the motorcycle 1, the front forks 10 contract while the rear cushion 36 extends, which causes nosedive. In contrast, according to the present invention, the front suspension and the rear suspension are respectively caused to contract and extend at separate timings at the early braking stage (1) and the middle braking stage (3), thereby making it possible to suppress abrupt nosedive.

Figure 7:
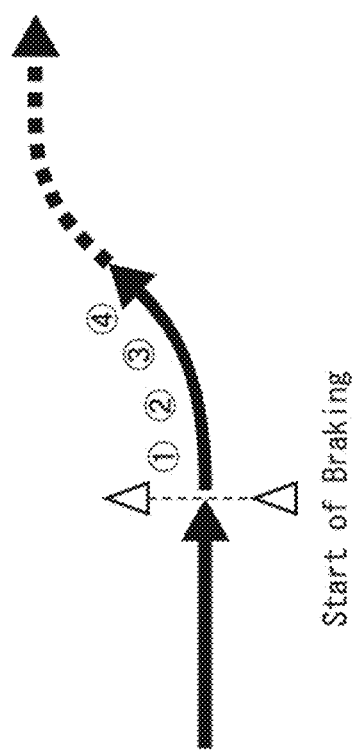
FIG. 7 is a conceptual diagram illustrating a configuration of a braking operation before entering a corner and in an avoidance action.
Figure 8:
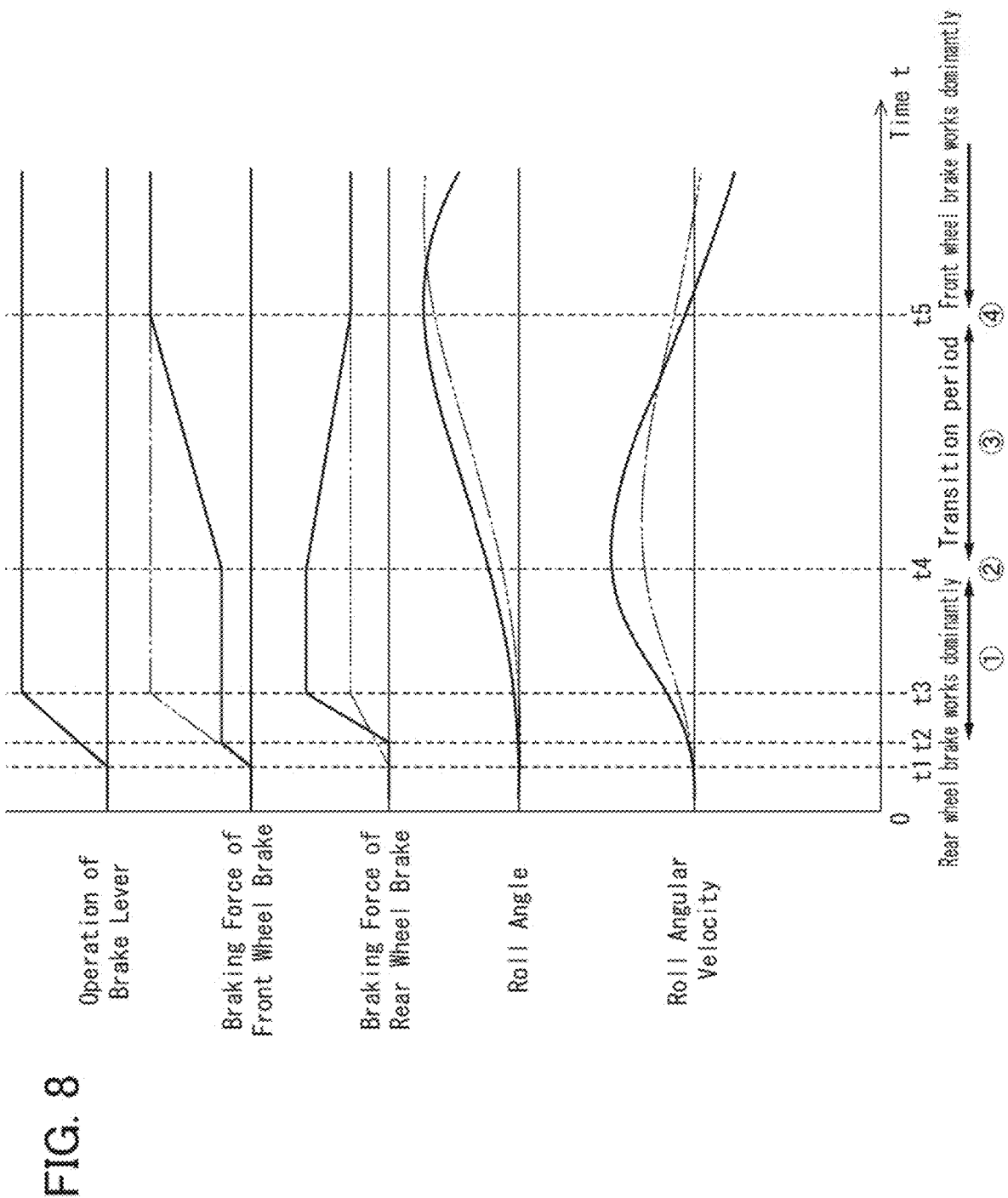
FIG. 8 is a graph illustrating changes in parameters corresponding to the braking operation of FIG. 7.

FIG. 7 is a conceptual diagram illustrating a configuration of a braking operation before entering a corner and in an avoidance action;

FIG. 8 is a graph illustrating changes in parameters corresponding to the braking operation of FIG. 7. In both FIGS. 7 and 8, "1" in a circle (hereinafter described as (1)) represents an early braking stage at which the rear wheel brake dominantly works, "2" in a circle (hereinafter described as (2)) represents a timing at which transition starts, "3" in a circle (hereinafter described as (3)) represents a middle braking stage as a transition period, and "4" in a circle (hereinafter described as (4)) represents a late braking stage at which the front wheel brake dominantly works.

The graph of FIG. 8 shows, in the order from top to bottom, an operation of the brake lever, a braking force of the front wheel brake, a braking force of the rear wheel brake, a roll angle, and a roll angular velocity. In the graph, the changes in the case of the control according to the present invention are indicated by the solid lines, and the changes in the case of the conventional control are indicated by the two-dot chain lines. Times t1 to t5 in FIG. 8 correspond to those of the graph of FIG. 4.

The braking operation according to the present invention is roughly divided into three stages, i.e., the early braking stage (1) at which the rear wheel brake dominantly works, the middle braking stage (3) at which the relationship between the braking forces of the front wheel brake and the rear wheel brake in terms of braking force level is reversed, and the late braking stage (4) at which the front wheel brake dominantly works. According to the present invention, increasing the braking force distribution to the rear wheel brake at the early braking stage makes it easy to bank the vehicle body, and gradually increasing the front wheel braking force at the middle braking stage increase a force that keeps the vehicle body upright. This feature enables achievement of a good vehicle body behavior at the time of cornering and at the time of avoidance action. According to the vehicle body characteristics and the driving state described in the present embodiment, the timing at which the roll angular velocity of the vehicle body is maximized is substantially coincident with the timing (2) at which the transition starts. This feature enhances the following effect: the vehicle body is easily banked at the time of entering a corner or the like, and is easily brought back upright at the time of leaving the corner or the like while suppressing excessive banking.

Figure 9:
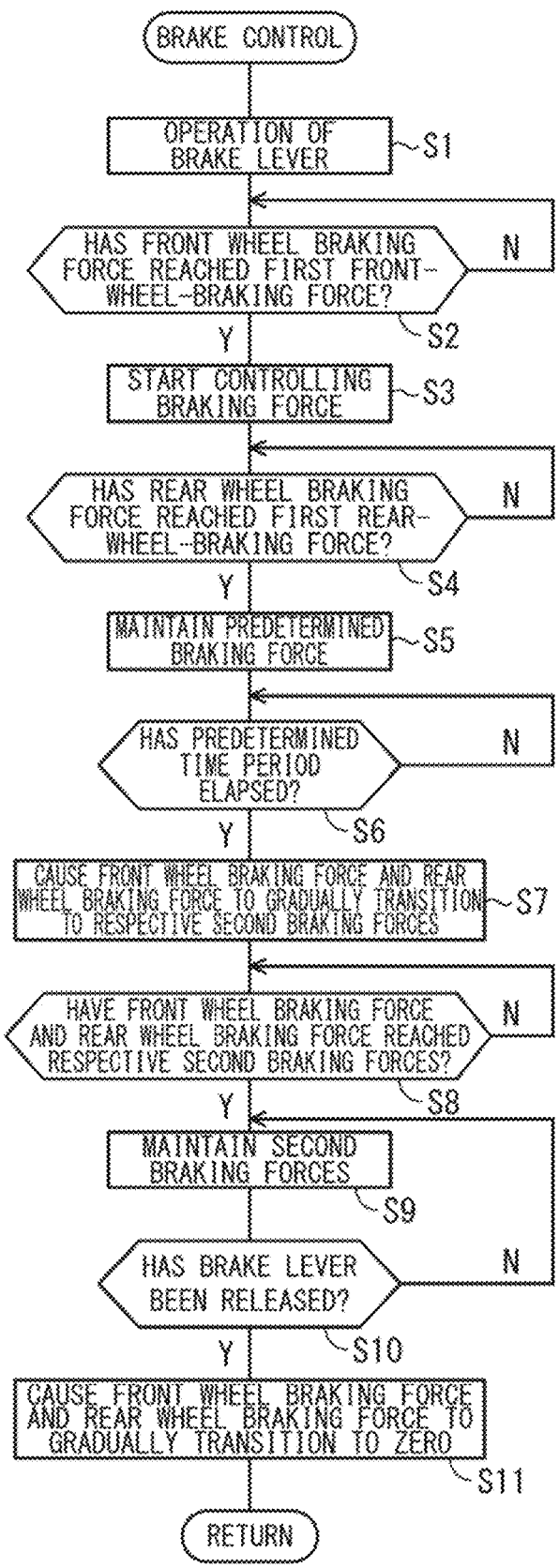
FIG. 9 is a flowchart illustrating a procedure of brake control according to an embodiment.

FIG. 9 is a flowchart illustrating a procedure of the brake control according to the present embodiment. In Step S1, in response to an operation of the brake lever 5, the front wheel braking component 32 starts a braking operation (time t1 in FIG. 4). In the subsequent Step S2, it is determined whether or not the front wheel braking force has reached the first front-wheel-braking force P1.

When the determination result in Step S2 is positive, it is determined that the braking condition of the front wheel braking component 32 has satisfied the first condition, and the process proceeds to Step S3, where braking force control for making the rear wheel control component 34 operate is started (time t2 in FIG. 4). When the determination result in Step S2 is negative, the process returns to the determination in Step S2.

In Step S4, it is determined whether or not the rear wheel braking force has reached the first rear-wheel-braking force P2. When the determination result in Step S4 is positive, the process proceeds to Step S5, where the rear wheel braking force is maintained at the first rear-wheel-braking force P2 as a predetermined braking force (time t3 in FIG. 4). When the determination result in Step S4 is negative, the process returns to the determination in Step S4.

In the subsequent step S6, it is determined whether or not a predetermined time period T1 has elapsed from when the first condition was satisfied, and when the determination result is positive, the process proceeds to Step S7. In Step S7, control is started which causes the front wheel braking force and the rear wheel braking force to gradually transition to the respective second braking forces (the second front-wheel-braking force P4 and the second rear-wheel-braking force P3) (time t4 in FIG. 4). When the determination result in step S6 is negative, the process returns to the determination in Step S6.

In Step S8, it is determined whether or not the front wheel braking force and the rear wheel braking force have reached the respective second braking forces, and when the determination result is positive, the process proceeds to Step S9, where the second braking forces (the second front-wheel-braking force P4 and the second rear-wheel-braking force P3) are maintained (time t5 in FIG. 4). When the determination result in step S8 is negative, the process returns to the determination in Step S8.

In the subsequent step S10, it is determined whether or not the brake lever 5 has been released. When the determination result is positive, the process proceeds to Step S11. When the determination result in Step S10 is negative, the process returns to the determination in Step S9. In Step S11, control is started which causes the front wheel braking force and the rear wheel braking force to gradually transition to zero (time t6 in FIG. 4). When the front wheel braking force and the rear wheel braking force become zero, the series of control steps ends (time t7 in FIG. 4).

Among the first front-wheel-braking force P1, the first rear-wheel-braking force P2, the second rear-wheel-braking force P3, and the second front-wheel-braking force P4 described above, the values of the first rear-wheel-braking force P2, the second rear-wheel-braking force P3, and the second front-wheel-braking force P4 may vary in accordance with an operation amount of the brake lever 5 (i.e., an actuating force generated by the front wheel master cylinder 40).

As described above, according to the front-rear interlocking brake system of the saddled vehicle of the present embodiment, first, the front wheel braking component 32 starts operating in response to an operation of the brake lever 5, and thereafter, the rear wheel braking component 34 starts operating in response to the braking force of the front wheel braking component 32 reaching the first front-wheel-braking force P1, so that a braking force is applied to the front wheel WF, and thereafter, a braking force is applied to the rear wheel WR, thereby suppressing nosedive of the vehicle body at the time of deceleration during linear traveling. In addition, the operation of the one operating element allows the vehicle body to behave to facilitate banking of the vehicle body at the time of deceleration before entering a corner, while making the interlocking brake work. Furthermore, since the braking force is applied to only the front wheel until the first condition is satisfied, it is possible to fill the need for the driver of a saddled vehicle equipped with the front-rear interlocking brake system to apply a braking force to only the front wheel.

Furthermore, in response to the braking force of the front wheel braking component 32 reaching the first front-wheel-braking force P1, the braking force of the rear wheel braking component 34 is increased while the braking force of the front wheel braking component 32 is maintained at the first front-wheel-braking force P1. Thus, the braking force for the rear wheel WR is increased while a constant braking force is being applied to the front wheel WF, thereby making it possible to apply the braking forces to the front and rear wheels more stably while gradually transferring the load on the front wheel WF to the rear wheel WR.

Furthermore, once the braking force of the rear wheel braking component 34 reaches the first rear-wheel-braking force P2, the braking force of the rear wheel braking component 34 is maintained at the first rear-wheel-braking force P2, thereby making it possible to suppress the nosedive of the vehicle body.

Moreover, in response to the lapse of the predetermined time period T1 from when the braking force of the front wheel braking component 32 reached the first front-wheel-braking force P1, the braking force of the front wheel braking component 32 starts transitioning to the second front-wheel-braking force P4, and the braking force of the rear wheel braking component 34 starts transitioning to the second rear-wheel-braking force P3, which is less than the second front-wheel-braking force P4. That is, in response to the lapse of the predetermined time period T1 from when the braking force of the front wheel braking component 32 reached the first front-wheel-braking force P1, the transition is started so that the braking force for the front wheel WF becomes greater than the braking force for the rear wheel WR. This feature makes it possible to naturally guide the driver's riding posture to a forward leaning posture while suppressing the nosedive of the vehicle body.

The configuration of the motorcycle, the structure of the front wheel braking component, the structure of the rear wheel braking component, the structures of the master cylinders, the structures of the brake modulators, the structure of the controller, the structures of the hydraulic pressure sensors, the setting of the predetermined time period, the setting of the second predetermined time period, the setting of the first front-wheel-braking force, the setting of the first rear-wheel-braking force, the setting of the second front-wheel-braking force, the setting of the second rear-wheel-braking force, and the like are not limited to those of the embodiment described above, and various modifications can be made. The brake system according to the present invention is applicable to various two-wheeled vehicles, three-wheeled vehicles, and the like.

EXPLANATION OF REFERENCE NUMERALS

1: Motorcycle (Saddled vehicle)
5: Brake lever (Operating element)
32: Front wheel brake caliper (Front wheel braking component)
34: Rear wheel brake caliper (Rear wheel braking component)
40: Front wheel master cylinder (Actuating force generator)
50: First hydraulic pressure sensor (Hydraulic pressure sensor)
WF: Front wheel
WR: Rear wheel
P1: First front-wheel-braking force
P2: First rear-wheel-braking force
P4: Second front-wheel-braking force
P3: Second rear-wheel-braking force
T1: Predetermined time period

What is claimed is:

1. A saddled vehicle (1) comprising:
a front wheel braking component (32) that applies a braking force from a front wheel brake modulator (70) to a front wheel (WE) in response to an operation of an operating element (5, 39); and
a rear wheel braking component (34) that applies a braking force from a rear wheel brake modulator (71) to a rear wheel (WR),
the saddled vehicle (1) being configured to operate the front wheel braking component (32) and the rear wheel braking component (34) in an interlocking manner in response to an operation of the single operating element (5, 39), wherein
in response to the operation of the operating element (5), the front wheel braking component (32) first starts operating, and thereafter, when a first condition is satisfied in which a braking force of the front wheel (WF) reaches a first front-wheel-braking force (P1), only a rear wheel braking force is increased in accordance with an operation amount of the operating element (5, 39), and after a lapse of a predetermined time period (T1) from when the first condition is satisfied, a distribution of the front wheel braking force is increased within a range of a target braking force of an entire vehicle.

2. The saddled vehicle according to claim 1, wherein
in response to satisfaction of the first condition, the braking force of the rear wheel braking component (34) is increased toward the target braking force of the entire vehicle while the braking force of the front wheel braking component (32) is maintained at the first front-wheel-braking force (P1).

3. The saddled vehicle (1) according to claim 2, wherein
once the braking force of the rear wheel braking component (34), which is increased, reaches a first rear-wheel-braking force (P2), the braking force of the rear wheel braking component (34) is maintained at the first rear-wheel-braking force (P2).

4. The saddled vehicle (1) according to claim 3, wherein the first rear-wheel-braking force (P2) varies in accordance with an operation amount of the operating element (5).

5. The saddled vehicle (1) according to claim 3, wherein
in response to a lapse of a predetermined time period (T1) from the satisfaction of the first condition, the braking force of the front wheel braking component (32) starts transitioning to a second front-wheel-braking force (P4), and the braking force of the rear wheel braking component (34) starts transitioning to a second rear-wheel-braking force (P3) that is less than the second front wheel-braking force (P4).

6. The saddled vehicle (1) according to claim 5, wherein
the second front-wheel-braking force (P4) and the second rear-wheel-braking force (P3) vary in accordance with an operation amount of the operating element (5).

7. The saddled vehicle (1) according to claim 5, further comprising:
an actuating force generator (40) configured to actuate the front wheel braking component (32) in response to an operation of the operating element (5), wherein
the first condition is that an actuating force generated by the actuating force generator (40) becomes equal to or greater than a predetermined value.

8. The saddled vehicle (1) according to claim 7, wherein
the actuating force generator (40) comprises a front wheel master cylinder that generates a hydraulic pressure in response to an operation of the operating element (5), and
the actuating force is a hydraulic pressure that is detectable by a hydraulic pressure sensor (50).

9. The saddled vehicle (1) according to claim 3, wherein
when a roll angular velocity of a vehicle body of the saddled vehicle (1) is maximized after the satisfaction of the first condition, the braking force of the front wheel braking component (32) starts transitioning to a second front-wheel-braking force (P4), and the braking force of the rear wheel braking component (34) starts transitioning to a second rear-wheel-braking force (P3) that is less than the second front wheel-braking-force (P4).

10. The saddled vehicle according to claim 1, wherein the predetermined time period (T1) is a period from an initial braking stage (12) in which the front wheel braking force reaches a predetermined value and the rear wheel braking force is increased, to a middle braking stage in which the distribution of the front wheel braking force starts to be increased.

* * * * *